(12) United States Patent
Geronimi (10) Patent No.: US 12,036,703 B2
(45) Date of Patent: Jul. 16, 2024

(54) CONTINUOUS LIQUEFACTION AND FILTRATION SYSTEM FOR WASTE PLASTIC TREATMENT

(71) Applicant: VALGROUP S.A., Luxembourg (LU)

(72) Inventor: Lucas Salim Geronimi, Lorena (BR)

(73) Assignee: VALGROUP S.A., Luxembourg (LU)

( * ) Notice: Subject to any disclaimer, the term of this patent is extended or adjusted under 35 U.S.C. 154(b) by 0 days.

(21) Appl. No.: 18/193,417

(22) Filed: Mar. 30, 2023

(65) Prior Publication Data

US 2023/0241806 A1 Aug. 3, 2023

Related U.S. Application Data (63) Continuation of application No. 17/071,184, filed on Oct. 15, 2020, now Pat. No. 11,731,319, which is a
(Continued)

(51) Int. Cl.
*B01D 1/00* (2006.01)
*B29B 17/02* (2006.01)
(Continued)

(52) U.S. Cl.
CPC ...... *B29B 17/02* (2013.01); *B29B 2017/0203* (2013.01); *B29B 2017/0255* (2013.01)

(58) Field of Classification Search
CPC . C10G 31/06; B01J 19/00; B09B 3/00; B09B 3/0083; B09B 2220/00; B29B 17/00; A61L 11/00
(Continued)

(56) References Cited

U.S. PATENT DOCUMENTS 5,597,451 A * 1/1997 Nagai .................. C10B 53/07
                                                                201/14
9,464,234 B1 * 10/2016 Tharpe, Jr. ............ C10B 49/08
(Continued)

FOREIGN PATENT DOCUMENTS

DE   19722586 A1   12/1998
JP   H0913045 A    1/1997
(Continued)

OTHER PUBLICATIONS

Belgiorno, V., et al., "Energy From Gasification of Solid Wastes", Waste Management, 2003, pp. 1-15, vol. 23, Issue 1, ISSN 0956-053X, Science Direct, Italy, https://www.sciencedirect.com/science/article/abs/pii/S0956053X02001496.
(Continued)

*Primary Examiner* — Monzer R Chorbaji
(74) *Attorney, Agent, or Firm* — Jacob M. Ward; Ward Law Office LLC (57) ABSTRACT

A continuous liquefaction and filtration system has a first device configured to melt and filter solid waste plastic material. A second device is in communication with the first device, and configured to melt solid waste plastic material. A feeding system is configured to feed waste plastic material into the first device. A vacuum unit is in communication with the first device and the second device. The vacuum unit configured to control a pressure level within the system. A method of processing solid waste plastic including the steps of providing the system and solid waste plastic; inserting the solid waste plastic into the first device; heating the solid waste plastic material; extracting the molten plastic with one of the extractors; sending a portion of the molten plastic to second device and recirculating another portion in the first device; and extracting the melt polymers.

20 Claims, 4 Drawing Sheets

Related U.S. Application Data continuation of application No. 16/779,753, filed on Feb. 3, 2020, now Pat. No. 10,814,525.

(60) Provisional application No. 62/895,617, filed on Sep. 4, 2019.

(51) Int. Cl.
*C10G 1/00* (2006.01)
*C10G 1/02* (2006.01)

(58) Field of Classification Search
USPC ................ 422/285, 307–308, 901; 208/400; 196/116
See application file for complete search history.

(56) References Cited

U.S. PATENT DOCUMENTS

| | | | |
|---|---|---|---|
| 2008/0296205 | A1 | 12/2008 | Kohara et al. |
| 2015/0259607 | A1 | 9/2015 | Chen |

FOREIGN PATENT DOCUMENTS

| | | | |
|---|---|---|---|
| JP | 3582898 | B2 | 10/2004 |
| JP | 2007302867 | A | 11/2007 |
| JP | 4489752 | B2 | 6/2010 |
| TW | 200535169 | A | 11/2005 |
| TW | I268946 | B | 12/2006 |

OTHER PUBLICATIONS

Written Opinion of the International Searching Authority dated Jul. 17, 2020.

* cited by examiner

CONTINUOUS LIQUEFACTION AND FILTRATION SYSTEM FOR WASTE PLASTIC TREATMENT

CROSS-REFERENCE TO RELATED APPLICATIONS

This application is a continuation of U.S. patent application Ser. No. 17/071,184, filed on Oct. 15, 2020, which claims priority to U.S. patent application Ser. No. 16/779,753, filed Feb. 3, 2020, which granted as U.S. Pat. No. 10,814,525 on Oct. 27, 2020, which in turn claims the benefit of U.S. Provisional Application Ser. No. 62/895,617, filed on Sep. 4, 2019. The entire disclosures of the above applications are incorporated herein by reference.

FIELD

The present technology relates to the treatment of plastic waste and, more specifically, to a system for liquefying plastic waste for treatment.

INTRODUCTION

Various Thermochemical treatment promotes the transformation of the chemical structure of raw plastic waste under high temperatures. The three main thermochemical treatment processes are combustion, gasification and pyrolysis. Each treatment process has different operations and consequently generate different products. For example, the three main thermochemical treatment processes are disclosed in BELGIORNO, V. et al. Energy from gasification of solid wastes. Waste Management, v. 23, n. 1, p. 1-15, 2003. ISSN 0956-053X.

There has been a gradual increase in the volume of plastic discarded each year. Mechanical recycling can only recycle some types of plastics. The other types of plastics cannot be recycled by conventional means and must be disposed in landfills or incinerators. The plastic recycling by the conventional means is not effective in the treatment of all types of plastic discarded.

There is a continuing need for a liquefaction and filtration system for plastic waste that is efficient, safe, and allows for treatment of plastic waste, including plastic waste in bale format, as a non-limiting example. Desirably, the liquefaction and filtration system provides an end product that may be used in further thermochemical treatments.

SUMMARY

A In concordance with the instant disclosure, an efficient and safe liquefaction and filtration system for thermochemical treatment of plastic waste, which creates an end product that may be used in further thermochemical waste treatments, has been surprisingly discovered.

The liquefaction of plastics is an essential process to break the carbon bonds of the plastic and allows for the application of the fractions in other processes. Breaking the carbon bonds of the plastic causes the formation of lower molecular weight fractions, which allows the utilization of these materials in other processes. Mainly, the products of liquefaction are used in thermochemical treatments.

Another important component of the system is the filtration step. The melted polymers contain various residues, which may consist of metals, stones, and sand. These residues may cause problems during the transfer processes. Thus, it is important to filter out the residues before transferring it for another type of use.

In one embodiment, a continuous liquefaction and filtration system has a first device configured to melt and filter solid waste plastic material. A second device is in communication with the first device, and is configured to maintain the plastic in the molten phase. A feeding system is in communication with the first device, and configured to feed waste plastic material into the first device. A plurality of extractors are in communication with the first device and the second device. A vacuum unit is in communication with the first device and the second device. The vacuum unit is configured to control a pressure level within the continuous liquefaction and filtration system.

In a further embodiment, a method of processing solid waste plastic including the steps of providing a liquefaction and filtration system having a first device configured to melt and filter solid waste plastic material. A second device is in communication with the first device, and is configured to maintain the plastic in the molten phase. A feeding system may be in communication with the first device, and configured to feed waste plastic material into the first device. A plurality of extractors are in communication with the first device and the second device. A vacuum unit is in communication with the first device and the second device. The vacuum unit is configured to control a pressure level within the continuous liquefaction and filtration system; provide solid waste plastic without treatment; and then insert the solid waste plastic material into the first device through the feeding zone. The solid waste plastic material is then heated in the first device, where it melts and forms molten plastic. The molten plastic waste is then extracted with one of the plurality of extractors. A portion of the molten plastic is then sent to second device and an other portion of the molten plastic is recirculated in the first device. The molten plastic is then extracted with a second extractor.

In an exemplary embodiment, a continuous liquefaction system for waste plastic treatment includes a first device that receives raw plastic waste through a feeding system. The raw plastic waste may be in a bale format, as a non-limiting example. It should be appreciated that the raw plastic waste that enters the system does not need any pre-treatment, nor the removal of any wires that may be present in the raw plastic waste.

When entering the first device, the raw plastic waste may pass through a plurality of tubes or a tube, as a non-limiting example. These tubes may be filled with a heating element. The heating element may be, as a non-limiting example, molten salt. The raw plastic waste is heated by the tubes until the material melts.

When the material in the first device has melted, a portion of the molten material is sent to a second device using an extractor. Accordingly, the second device may have a plurality of tubes or a tube filled with a molten salt heating element.

Another portion of the molten material from the first device may be recirculated to the first device using a pump. It should be appreciated that the recirculation of the molten plastic increases the efficiency of the liquefaction system and may improve the rate at which raw plastic waste may be melted.

Any material that does not liquefy at the process temperature is sent, by gravity, to a bottom portion of the first device to be extracted by a solids extraction system.

The material sent to the second device may continue to be heated using the tubes filled with molten salt in order to maintain the melt temperature. The molten material from the second device will be extracted using an extractor. The extracted material from the second device may be provided for some other application. Advantageously, the molten material from the second device could be used in an extrusion system, a pyrolysis system, or other suitable systems.

The first device may process the raw plastic waste under negative pressure (i.e., a vacuum). The first device includes a feeding system, a clear zone, a process zone, an extraction system, an extractor, and a vacuum unit.

The raw plastic waste in bale formats, as a non-limiting example, enters the first device through the feeding system. The feeding system has a pre-chamber that receives the raw plastic waste and extracts any wires in the raw plastic waste using an automatic extraction wire system. When the pre-chamber is full, a first valve actuates a door of the pre-chamber, which causes the raw plastic waste to fall to a chamber. The chamber has a thin water film over the door in order to not melt the material prematurely. If the raw plastic waste were to melt prematurely, it could undesirably stick to and break the second valve.

The second valve actuates the chamber door. When the door closes again, a water valve opens for a pre-determined time, in order to form a water film over a door of the chamber. The valves are actuated by a system with a servo driver, which precisely controls the opening and closing position of the doors. This process is repeated until the load cells indicate the weight of material that corresponds approximately to the full level of the process zone.

The raw plastic waste, when entering the first device, passes through the clear zone, which corresponds to about 10% of the volume of the first device. The clear zone allows the control of gas formation and consequently, controls the pressure inside the reactor. The gases formed during the process may be extracted using a vacuum unit. Also, a pressure sensor sends a feedback to the control unit, which controls the internal pressure by controlling the vacuum unit.

The clear zone provides a space that is essential for the uniform distribution of the material inside the process zone. The clear zone militates against obstruction of the second valve during the closing process.

After passing the clear zone, the raw plastic waste passes to the process zone. The process zone has tubes filled with molten salt at about 280° C. to about 320° C. The tubes or tube are aligned with a longitudinal axis of the process zone. The tubes may be disposed at the periphery of the first device in order to heat the process zone.

The material then goes to a conic zone, where it starts to melt. The system has temperature sensors in different levels of the device to give feedback of internal temperatures in order to send a feedback to the control unit that controls the molten salt flux by a molten salt pump inverter.

The molten material may exit the first device by an extractor, and is partially sent to the second device and partially recirculated to the first device. The fraction that recirculates helps in the heat transfer to the materials that are still solid inside the molten mass. The fraction directed to the second device is kept heated and can be sent back to the first device to increase the level of material if it is necessary, or can be sent to other applications such as pyrolysis process, extrusion and other suitable processes. The solid materials that were not molten at the process temperature accumulate in the conic zone of the first device.

When the molten process is finished, the equipment may be cleaned. The first device may operate in a low temperature pyrolysis mode for the cleaning process. In this mode, which is automatically controlled by the control system, the feeding process is suspended, and the internal volume of material is reduced until it reaches between about 10% and about 15% of the first device capacity and the temperature of the molten salt is increased to about 450° C. At this temperature, the residues that are stacked in the tubes melt and pass with the solids to the solids extraction system.

The solids extraction system is composed of a feeding zone, a compression zone, and a cooling zone. The solids extraction system operates when the first device is operating at low temperature pyrolysis mode as described hereinabove.

The solids accumulated in the conic zone may enter the feeding zone by force of a pressure difference. A motor actuates a screw, which compresses the solid particles against the valve in the compression zone. The compression step occurs until the motor reaches the amperage set point, which indicates that the material is compressed. After the material is compressed, a pair of valves open. The motor may be fired again for a pre-determined time, so the material is pushed to the cooling zone. The valves may simultaneously close. The valve in the compression zone may remain opened to allow the vacuum unit to function.

Water may be inserted in the cooling zone through a water valve for a pre-determined time to refrigerate the particles. The motor may continue compressing additional solid particles in the compression zone. The water valve may be closed. Following a pre-determined time, the gas is removed and the valves may be opened. The complete cycle of steps may be repeated, as needed. The new volume of material may be inserted in the feeding zone, which may push the material from the cooling zone through the valve out of an exit.

The vacuum unit allows the system to operate under negative pressure. The vacuum unit may have a filter, an atmosphere control device, a vacuum pump, and a bubbler. The filter may be a coalescing filter jacketed with water. The jacket allows the system to work with high temperature gases. The filter allows for the retention of solid particles that could damage the pump.

The vacuum pump may be a liquid-ring pump, which may execute multiple functions. The vacuum pump may allow for the removal of contaminants since the water that refrigerates the pump acts as an absorber to many contaminants that could be present in the plastic waste material. The vacuum pump may remove contaminants such as small particulates of chlorine, sulfur, and other similar contaminants. The water with the contaminants that is expelled from the pump may be directed to a bubbler, where it will be treated.

The bubbler has many functions such as: receiving and treatment of the contaminated water from the vacuum pump; absorption of the contaminants that may be present in the gases; monitoring emissions; and treating the non-condensable gases from the pyrolysis process.

There is an atmosphere controller disposed between the filter and the vacuum pump. The atmosphere controller is equipped with chlorine sensors, combustible gases sensors, and others necessary to the control of the local atmosphere. This system attends the first device, the chamber and the extraction system. When vacuum is necessary in one of these systems, the control unit may operate the valves.

After the solid removal, the valves are closed and nitrogen gas is inserted until the pressure reaches about 1000 mbar. When this pressure is reached the valves are opened and the pressure is reduced. This procedure of nitrogen insertion is repeated as many times are necessary until the internal temperature reaches about 300° C. The molten salt temperature is also reduced until reaches about 300° C. When this temperature is reached, a new process can start.

DRAWINGS

The above, as well as other advantages of the present disclosure will become readily apparent to those skilled in the art from the following detailed description, particularly when considered in the light of the drawings described hereafter.

DETAILED DESCRIPTION

The following description is merely exemplary in nature and is not intended to limit the present disclosure, application or uses. It should be understood that throughout the drawings, corresponding reference numerals indicate like or corresponding parts and features. In respect of the methods disclosed, the order of the steps presented is exemplary in nature, and thus, is not necessary or critical unless otherwise disclosed.

Figure 1:
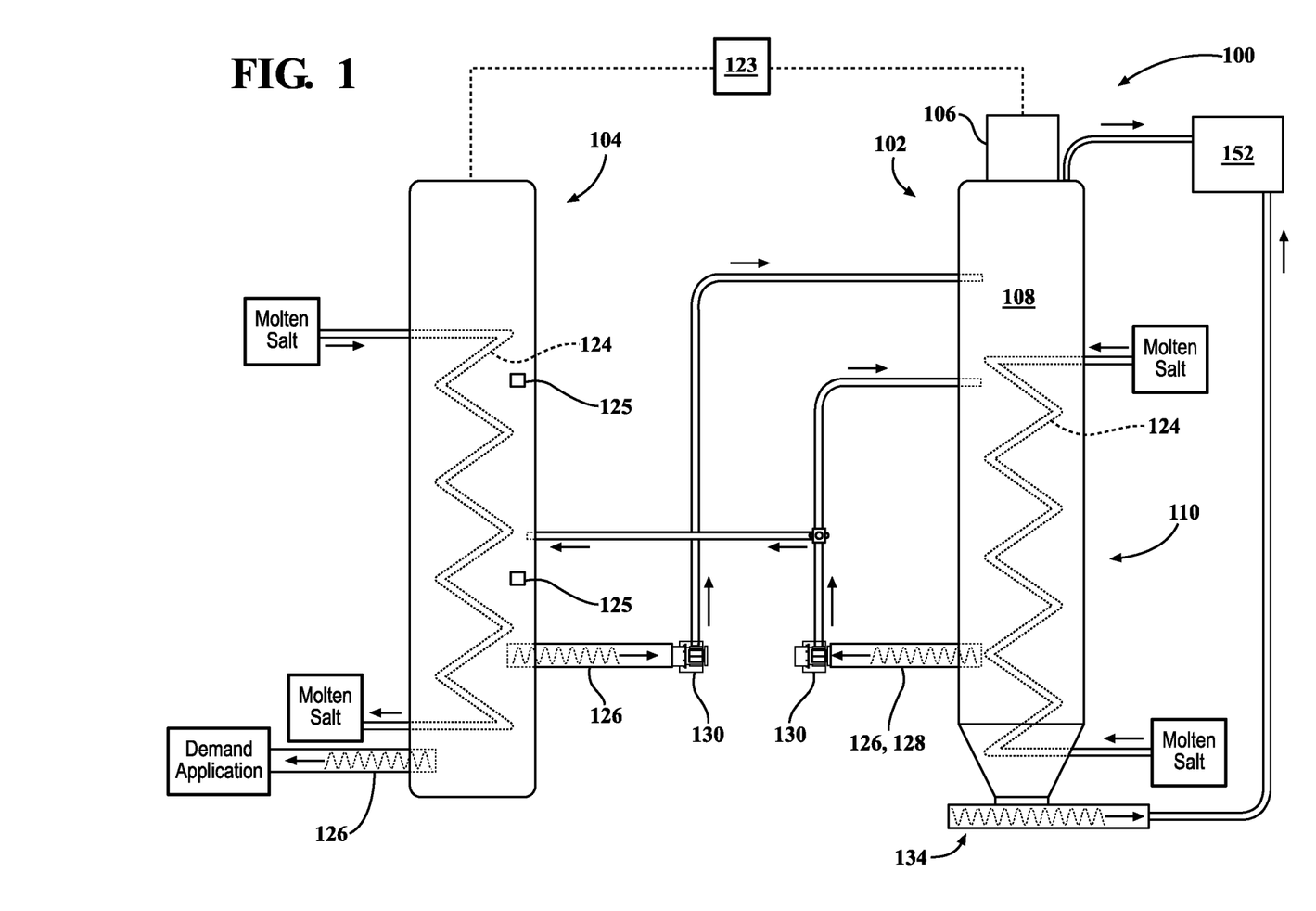
FIG. 1 is a schematic view of a continuous liquefaction and filtration system for waste plastic treatment according to one embodiment of the present disclosure.
Figure 2:
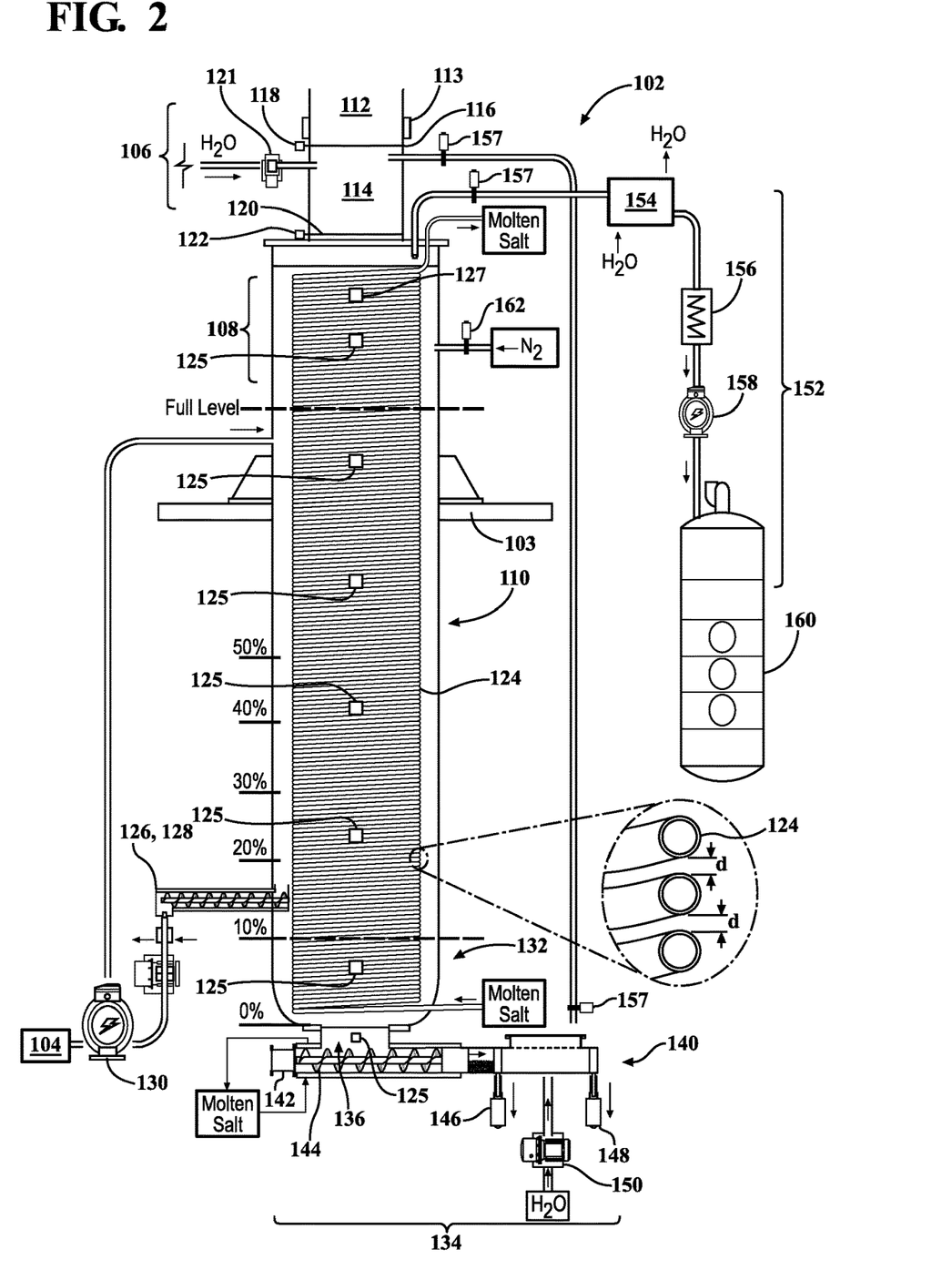
FIG. 2 is a schematic view of a first device of the continuous liquefaction and filtration system for waste plastic treatment shown in FIG. 1.
Figure 3:
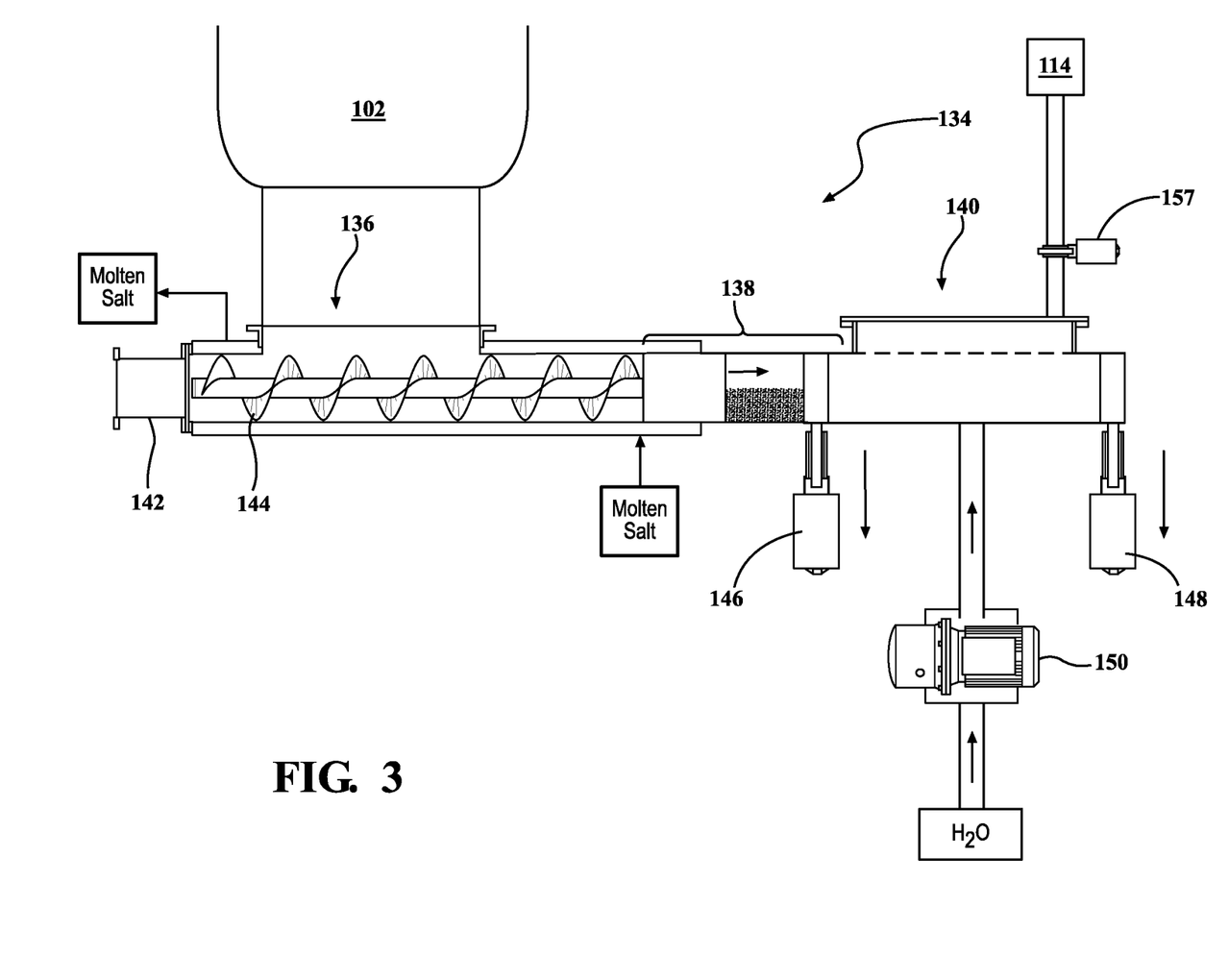
FIG. 3 is a schematic view of an extraction system of the continuous liquefaction and filtration system for waste plastic treatment shown in FIG. 1.

With reference to FIGS. 1-3, a continuous liquefaction and filtration system 100 for waste plastic treatment is shown. The continuous liquefaction and filtration system 100 may include a first device 102, which may be configured to melt and filter solid waste plastic material, and a second device 104, which may be in communication with the first device 102 and also configured to melt solid waste plastic material. It should be appreciated that the continuous liquefaction and filtration system 100 includes the first device 102 and the second device 104 in series. Advantageously, the use of two liquefiers allows the system to operate both continuously and efficiently.

The continuous liquefaction and filtration system 100 may further include a feeding system 106, which may be in communication with the first device 102. The feeding system 106 may be configured to feed solid waste plastic material into the first device 102. The first device 102 may also have a platform 103. The platform 103 may be disposed on the first device 102, and contains a load cell, which may control a volume of material inside the first device 102.

The load cell may be force transducer, which may be configured to measure a force exerted by the solid waste plastic material. The force may be used to calculate a mass of material inside the first device 102. With the calculated mass of material in the first device 102 and a known density of material, the volume of material inside the first device may be calculated. A skilled artisan may use other suitable methods of measuring the volume of material in the first device 102, as desired.

With reference to FIG. 2, the first device 102 may include the feeding system 106, a clear zone 108, and a process zone 110. The first device 102 may receive raw plastic waste through the feeding system 106. The solid waste plastic material may be compacted without pretreatment in bale format, as a non-limiting example. It should be appreciated that the raw plastic waste that enters the continuous liquefaction and filtration system 100 does not require any pre-treatment. For example, any wires that may be present in the solid waste plastic material need not be removed before treatment via the continuous liquefaction and filtration system 100.

The feeding system 106 may have a pre-chamber 112 that receives the solid waste plastic material. An automatic wire extraction system 113 may be disposed within the pre-chamber 112, and may be configured to remove any wires present in the solid waste plastic material.

The feeding system 106 may have a chamber 114. The chamber 114 may be separated from the pre-chamber 112 by a first door 116. A first valve 118 may actuate the first door 116. Advantageously, the first door 116 and the first valve 118 allow solid waste plastic material to selectively pass from the pre-chamber 112 to the chamber 114, in operation.

A second door 120 may be disposed between the chamber 114 and process zone 110. A second valve 122 may selectively actuate the second door 120. A water film may be formed over the second door 120. Advantageously, the second door 120 and the second valve 122 allow solid waste plastic material to selectively pass from the chamber 114 to the clear zone 108, in operation.

Each of the first valve 118 and the second valve 122 may be actuated by a driver, for example, a servo driver. The driver may selectively actuate each of the first valve 118 and the second valve 122, in operation, until a pre-determined amount of solid waste plastic material is disposed in the process zone 110, as measured by the load cell.

Figure 4:
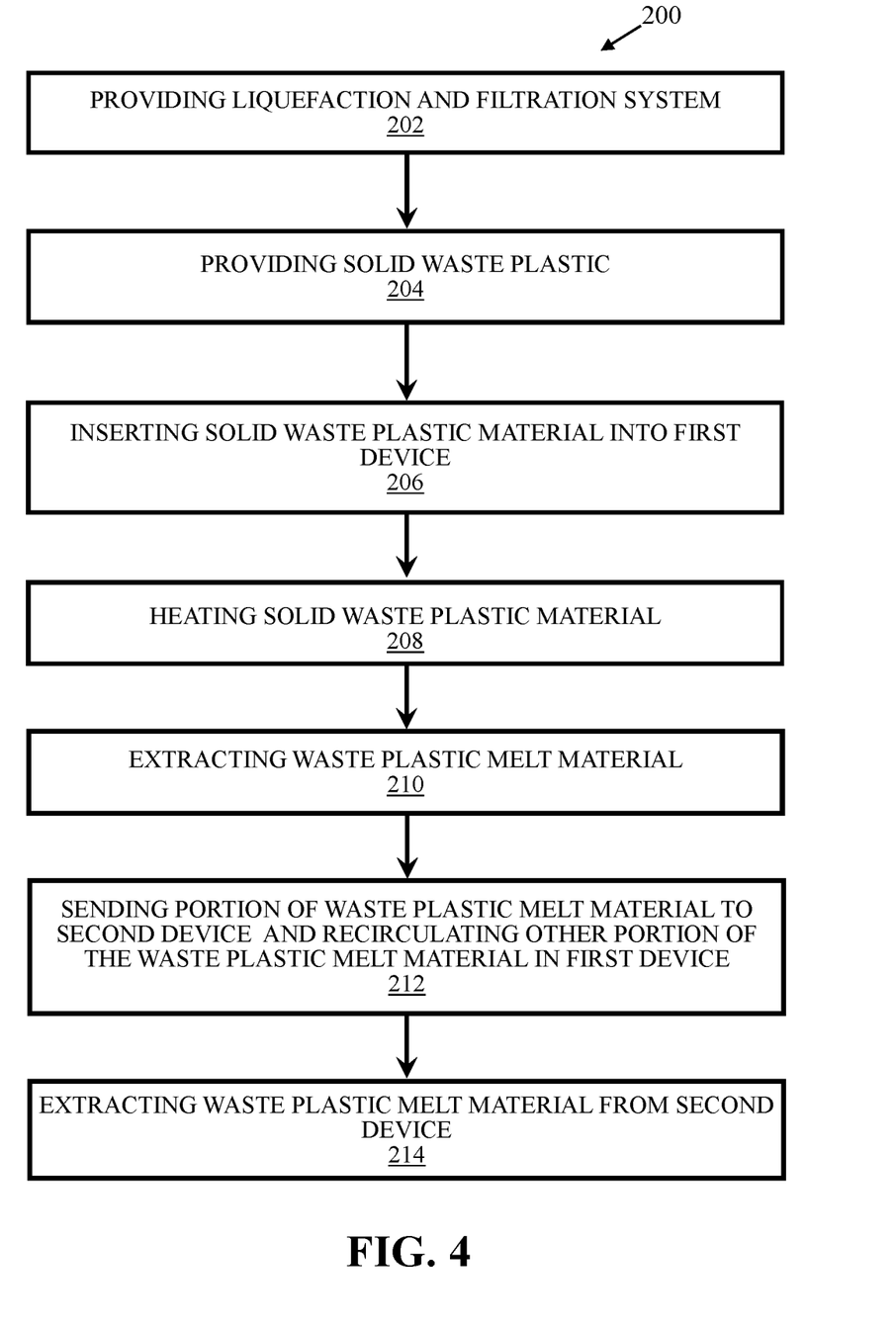
FIG. 4 is a flow chart illustrating a method of processing solid waste plastic according to another embodiment of the present disclosure.

The drivers, and likewise the first valve 118 and the second valve 122, may be in communication with a control unit 123 which is configured to selectively actuate the drivers. The control unit 123 may include a computer having a processor and a memory with non-transitory processor-executable instructions tangibly embodied thereon. The control unit 123 may further have a human interface such as a touchscreen or manual controls that permits an operator to operate the system 100. In particular, the control unit 123 may be configured to execute the method 200 of the present disclosure, for example, as shown in FIG. 4 and described hereinbelow. One skilled in the art may select other suitable types of control units within the scope of the present disclosure.

It should be appreciated that the control unit 123 may be in electrical communication with the first device 102 and the second device 104. Further, the control unit 123 may be configured to monitor the continuous liquefaction and filtration system 100, such that the control unit may be configured to send and receive signals at pre-determined locations throughout the continuous liquefaction and filtration system 100.

As established hereinabove, a thin water film may also be selectively disposed on the second door 120 in order to militate against premature liquefaction of solid waste plastic material. For example, when the second door 120 closes again, a water valve 121 may open for a pre-determined time, in order to form a water film over the second door 120 of the chamber. The water valve 121 may be in communication with the control unit 123, and the control unit 123 likewise configured to control the opening and closing of the water valve 121. Advantageously, the water film may militate against the solid waste plastic material from undesirably melting in the chamber 114, thereby militating against damage to the second door 120 in operation.

With continued reference to FIG. 2, the clear zone 108 may correspond to approximately 10% of a volume of the first device 102. The clear zone 108 may militate against formation of gases in the first device 102. Accordingly, the clear zone may contain a temperature sensor 125 and a pressure sensor 127, which may be configured to monitor the clear zone 108. The clear zone 108 may thereby aid in controlling pressure inside the continuous liquefaction and filtration system 100.

In operation, solid waste plastic material may pass from the feeding system 106, through the clear zone 108, and into the process zone 110. The clear zone 108 is not configured to receive solid waste plastic material, but may provide a space between the feeding system 106 and the process zone 110. Advantageously, the clear zone 108 may aid in uniform distribution of the solid waste plastic material inside the process zone 110. Further, the clear zone 108 militates against obstruction of the second door 120 and the second valve 122.

The process zone 110 of the first device 102 may have a tube 124 disposed therein. The tube 124 may be a coiled tube as shown in FIG. 2, as a non-limiting example. Other suitable shapes and arrangements for the tube 124 may be utilized by a skilled artisan.

The tube 124 may be filled with a heating element such as molten salt, as a non-limiting example. Other suitable types of heating elements may also be employed within the scope of the present disclosure.

In operation, the solid waste plastic material may be melted or liquefied where it contacts the heated tube 124. As a non-limiting example, the heating element may be molten salt at a temperature of between about 280° C. and about 320° C. A plurality of the temperature sensors 125 may be disposed along a length of the process zone 110. The temperature sensors 125 may provide feedback about internal temperatures in the process zone 110 to the control unit 123. The control unit 123 may control a molten salt pump, and therefore, control a flow of the molten salt in the tube 124. A skilled artisan may select another suitable heating element and temperature, as desired.

The tube 124 of the present disclosure is strategically designed to work both as a heat transfer exchanger and as a filter. The coil of the tube 124 may have a plurality of layers, which may be wound along the length of the process zone 110. It should be appreciated that each of the layers of the coil of the tube 124 may be spaced apart from adjacent layers by a distance (d) or "filtration space." The distance (d) may be configured to allow certain materials, such as aluminum caps and small rocks, as a non-limiting examples, along with melted plastic waste material to pass through the layers of the tube 124. Further, larger or undesirable materials, such as aluminum cans, as a non-limiting example, and other debris may not pass through the distance (d) between the layers of the tube 124. As a non-limiting example, the distance (d) may be between about ten millimeters (10 mm) and about twenty millimeters (20 mm). Other suitable dimensions for the distance (d) may be selected by the skilled artisan within the scope of the present disclosure.

Accordingly, the tube 124 may be configured to function as a filter for undesirable material that may be present in the plastic waste, such as metals, rocks, sand, and other materials that do not liquefy at process temperature. Advantageously, the tube 124 may be used simultaneously as a heating element to melt plastic waste material and a filter for the plastic melt material.

The continuous liquefaction and filtration system 100 may have a plurality of extractors 126. The extractors 126 may be in communication with the first device 102 and the second device 104. The molten and filtered waste plastic material may be removed from the first device 102 by a first extractor 128 of the plurality of extractors 126.

As shown in FIG. 1, a portion of the molten waste plastic material removed from the first device 102 may be sent to the second device 104 by a pump 130. An other portion of the molten waste plastic material removed from the first device 102 may be recirculated to first device 102 via the pump 130. Advantageously, the portion of molten waste plastic material that is recirculated in the first device 102 may aid in heat transfer to solids inside the molten mass. It should be appreciated that the recirculation of the molten plastic increases the efficiency of the liquefaction system and may improve the rate at which solid waste plastic material may be melted.

The material sent to the second device 104 may continue to be heated using the tube 124, which may be filled with molten salt, in order to maintain the melt temperature. The melted material from the second device 104 may be extracted using a second extractor 131 of the plurality of extractors 126. The second device 104 may have temperature sensors 125 and configured to monitor the conditions within the second device 104. The sensors may provide feedback to the control unit 123. It should be appreciated that the extracted material from the second device 104 may be provided for some other application. Advantageously, the melted material from the second device 104 could be used in an extrusion system or a pyrolysis system, as non-limiting examples.

The undesirable material that is filtered out of the molten waste plastic material by the tube 124 may fall to a bottom portion 132 of the first device 102. The undesirable material may be removed from the bottom portion 132 via a solids extraction system 134.

The first device 102 may be cleaned after the molten waste plastic material is removed via the first extractor 128. The first device 102 may operate in a low temperature pyrolysis mode during a cleaning process. In the low temperature pyrolysis mode, which is automatically controlled by the control unit 123, the feeding process is suspended. An internal volume of material may be reduced until it reaches a pre-determined amount, for example, from about 10% to about 15% of the volume of the first device 102. The temperature of the molten salt is increased to 450° C., where any remaining residues in the tube 124 may be melted and directed to the solids extraction system 134. A skilled artisan may select other suitable volumes and temperatures for the cleaning process, as desired.

With reference to FIG. 3, the solids extraction system 134 is shown. The solids extraction system 134 includes a feeding zone 136, a compression zone 138, and a cooling zone 140. The solids extraction system 134 may operates where the first device 102 is operating in the low temperature pyrolysis mode, as described hereinabove. The feeding zone 136 may be jacketed by a heat exchanger, for example, molten salt.

The undesirable material accumulated in the bottom zone 132 may enter the feeding zone 136 by a force of a pressure difference. A motor 142, controlled by the control unit 123, may actuate a screw 144, which may compress the undesirable material against a compression valve 146 in the compression zone 138. The compression may occur until the motor 142 reaches a predetermined amperage set point, which indicates that the undesirable material is compressed. After the material is compressed, the compression valve 146 of the compression zone 138 and a cooling valve 148 of the cooling zone 140 may open. The motor 142 may be actuated again for a pre-determined time, so the undesirable material may be pushed to the cooling zone 140. The compression valve 146 of the compression zone 138 and the cooling valve 148 of the cooling zone 140 may be simultaneously closed.

Water may be inserted into the cooling zone 140 through a water valve 150 for a pre-determined time to refrigerate the undesirable solid particles. The motor 142 may continue compressing additional undesirable material in the compression zone 138. The water valve 150 may then be closed. Following a pre-determined time, the gas is removed. The valve 146 of the compression zone 138 and the valve 148 of the cooling zone 140 may then be opened. The complete cycle of steps may be repeated, as needed. The new volume of material may be inserted in the feeding zone 136, which may push the material from the cooling zone 140 out of an exit.

With renewed reference to FIG. 2, a vacuum unit 152 allows the system to operate under negative pressure. The vacuum unit 152 may have a filter 154, an atmosphere control device 156, a vacuum pump 158, and a bubbler 160. The filter 154 may be a coalescing filter jacketed with water, as a non-limiting example. The jacket allows the vacuum unit 152 to work with high temperature gases. The filter 154 may allow for retention of solid particles that could damage the vacuum pump 158.

With continued reference to FIG. 2, the vacuum pump 158 may be a liquid-ring pump, which may be configured to execute multiple functions. The vacuum pump 158 may allow for the removal of contaminants since the water that refrigerates the vacuum pump 158 acts as an absorber to many contaminants that may be present in the plastic waste material. The vacuum pump 158 may remove contaminants such as small particulates of chlorine, sulfur, and others, as non-limiting examples. The water with the contaminants may be expelled from the vacuum pump 158 and may be directed to the bubbler 160, where the water may be treated.

The bubbler 160, as shown in FIG. 2, has many functions such as: receiving and treating the contaminated water from the vacuum pump 158; enhancing an exposition area of the gases in the water which allows for a better absorption of the contaminants; monitoring emissions; and treating the non-condensable gases from the low temperature pyrolysis process.

The atmosphere control device 156 may be disposed between the filter 154 and the vacuum pump 158. The atmosphere control device 156 may be equipped with chlorine sensors, combustible gases sensors, and other sensors, which may be necessary to control a local atmosphere. The atmosphere control device 156 may itself be in communication with, and controlled by, the control unit 123 for the system 100. The atmosphere control device 156 may operate a plurality of valves 157 of the vacuum unit 152.

After the solid removal, the plurality of valves 157 may be closed. Nitrogen gas may be inserted, via a nitrogen pump 162, until the pressure reaches a predetermines amount. The predetermined amount may be about 1000 mbar, as a non-limiting example. When the predetermine amount of pressure is reached the plurality of valves 157 may be opened and the pressure is, thereby, reduced. This procedure of nitrogen insertion may be repeated as many times are necessary until an internal temperature of the first device 102 reaches about 300° C. A temperature of the molten salt may be also reduced until reaches about 300° C. When this temperature is reached, a new process can start in the liquefaction and filtration system 100.

The present disclosure further contemplates a method 200 of processing solid waste plastic, for example, as shown in FIG. 4. A first step 202 in the method 200 may be providing the liquefaction and filtration system 100, as described hereinabove.

A second step 204 of the method 200 may be providing solid waste plastic without any pretreatment, including in bale format, as a non-limiting example.

A third step 206 in the method 200 may include inserting the solid waste plastic material into the first device 102 through the feeding system 106. In the feeding system 106 wires may be removed from the solid waste plastic through the using the automatic wire extraction system 113. The material may pass from the feeding system 106, through the clear zone 108, and into the process zone 110.

A fourth step 208 in the method 200 may include heating the solid waste plastic material in the first device 102, forming molten plastic. More particularly, the solid waste plastic material may come into contact with the tube 124, which thereby melts the solid waste plastic material.

A fifth step 210 in the method 200 may include extracting the molten plastic with the first extractor 128 of the plurality of extractors 126.

A sixth step 212 in the method 200 may include sending a portion of the molten plastic to second device 104 and recirculating an other portion of the molten plastic in the first device 102.

A seventh step 214 of the method 200 may include extracting the molten plastic with the second extractor 131 of the plurality of extractors 126 on the second device 104. The extracted melt material may be used in further demand application or processes, such as, a pyrolysis reactor.

It should be appreciated that the continuous liquefaction and filtration system 100 of the present disclosure utilizes a first device 102 and second device 104 in series to melt and filter waste plastic material. The use of two liquefiers allows the liquefaction and filtration system 100 to continuously run, while also providing an efficient system to create molten plastic for further treatment.

While certain representative embodiments and details have been shown for purposes of illustrating the invention, it will be apparent to those skilled in the art that various changes may be made without departing from the scope of the disclosure, which is further described in the following appended claims.

What is claimed is:

1. A continuous liquefaction and filtration system, comprising:
    a first device configured to melt and filter solid waste plastic material to form molten plastic, the first device including a process zone, the process zone including a plurality of temperature sensors disposed along a length of the process zone, the plurality of temperature sensors configured to provide feedback about internal temperatures in the process zone;
    a second device in communication with the first device, the second device configured to receive the molten plastic;
    a feeding system in communication with the first device, the feeding system configured to feed the solid waste plastic material to the first device;
    a plurality of extractors, the plurality of extractors including a first extractor and a second extractor, the first extractor disposed on the first device and configured to remove molten plastic from the first device and the second extractor disposed on the second device and configured to remove molten plastic from the second device; and a control unit configured to control the first device, the second device, and the feeding system, the control unit configured to receive the feedback about internal temperatures in the process zone from the plurality of temperature sensors.

2. The continuous liquefaction and filtration system of claim 1, wherein the feeding system includes a pre-chamber and a chamber disposed in series on a top of the first device, and the pre-chamber and the chamber are selectively separated by a door.

3. The continuous liquefaction and filtration system of claim 2, wherein an automatic extraction wire system is disposed in the pre-chamber.

4. The continuous liquefaction and filtration system of claim 1, wherein each of the extractors includes a motor, a screw, and a plurality of valves.

5. The continuous liquefaction and filtration system of claim 4, wherein the motor is configured to actuate the screw, the screw configured to compress the molten plastic being removed from the first device or the second device.

6. The continuous liquefaction and filtration system of claim 5, wherein the motor is configured to operate for a predetermined time to remove the molten plastic to a cooling zone.

7. The continuous liquefaction and filtration system of claim 4, wherein the motor is configured to compress the molten plastic in a compression zone.

8. The continuous liquefaction and filtration system of claim 1, further comprising a vacuum unit in communication with the first device and the second device, the vacuum unit configured to control a pressure level within the continuous liquefaction and filtration system.

9. The continuous liquefaction and filtration system of claim 8, wherein the vacuum unit includes a filter, an atmosphere controller, a vacuum pump, and a bubbler, each in communication with the first device.

10. The continuous liquefaction and filtration system of claim 9, wherein the vacuum pump includes a liquid-ring pump.

11. The continuous liquefaction and filtration system of claim 9, wherein the vacuum pump is configured to remove contaminants in the plastic waste material.

12. The continuous liquefaction and filtration system of claim 9, wherein the filter includes a coalescing filter jacketed with water.

13. The continuous liquefaction and filtration system of claim 9, wherein the filter is configured to retain plastic particles.

14. The continuous liquefaction and filtration system of claim 1, wherein the first device includes a pump in communication with the second device, the pump configured to selectively send the molten plastic to one of the first device or the second device.

15. The continuous liquefaction and filtration system of claim 1, wherein the control unit is configured to monitor the continuous liquefaction and filtration system using the plurality of temperature sensors and a pressure sensor.

16. The continuous liquefaction and filtration system of claim 1, wherein the control unit is configured to send and receive signals at pre-determined locations throughout the continuous liquefaction and filtration system.

17. The continuous liquefaction and filtration system of claim 1, further including a water valve in communication with the control unit, the control unit configured to control the opening and closing of the water valve.

18. A method of processing solid waste plastic, comprising:

providing a liquefaction and filtration system having
a first device configured to melt and filter solid waste plastic material to form molten plastic, the first device including a process zone, the process zone including a plurality of temperature sensors disposed along a length of the process zone, the plurality of temperature sensors configured to provide feedback about internal temperatures in the process zone;
a second device in communication with the first device, the second device configured to receive the molten plastic,
a feeding system in communication with the first device, the feeding system configured to feed the solid waste plastic material to the first device,
a plurality of extractors, the plurality of extractors including a first extractor and a second extractor, the first extractor disposed on the first device and configured to remove molten plastic from the first device and the second extractor disposed on the second device and configured to remove molten plastic from the second device, and
a control unit configured to control the first device, the second device, and the feeding system, the control unit configured to receive the feedback about internal temperatures in the process zone from the plurality of temperature sensors;
providing solid waste plastic;
inserting the solid waste plastic material into the first device through a feeding zone;
heating the solid waste plastic material in the first device, forming molten plastic;
extracting the molten plastic with one of the plurality of extractors;
sending a portion of the molten plastic to second device and recirculating an other portion of the molten plastic in the first device; and
extracting melt polymers with a second extractor.

19. The method of processing solid waste plastic of claim 18, further comprising a step of cleaning the equipment in a slow pyrolysis mode.

20. The method of processing solid waste plastic of claim 18, wherein the steps of heating the solid waste plastic material and extracting the molten plastic occur under vacuum conditions.

* * * * *